United States Patent Office 3,021,293
Patented Feb. 13, 1962

3,021,293
FIRE RETARDANT PROTECTIVE AND
DECORATIVE COATINGS
Paul Simon, Montreal, Quebec, Canada, assignor to The
Sherwin-Williams Company, Cleveland, Ohio, a corporation of Ohio
No Drawing. Filed Aug. 12, 1959, Ser. No. 833,149
6 Claims. (Cl. 260—3.3)

This invention relates to fire retardant paints primarily useful as a protective and decorative coating for use over a wide variety of substrates, but latently or inherently fire retardant in nature after deposition in thin films on a surface and upon exposure of the deposited film to the ambient atmosphere.

Fire retardant paints are not new. The prior art abounds with references to fire-proofing compositions and fire retardant compositions which may be applied in paint form and which are said to be useful in retarding fire and flame spread.

The composition of the present invention provides a coating which is not only superior in its fire retardant quality after having been exposed to flame, but also provides a coating composition of value strictly as such for its protective and decorative quality prior to meeing with an unfriendly fire. Heretofore the prior art fire retardant paints have left much to be desired in their quality of applicability to surfaces. Most have little or no flow quality and hence do not provide the necessary smoothness of film to qualify for the usual protective and decorative coatings jobs, as, for example, application to the interior walls of a residential building. Also, in general, the prior art compositions having effective fire retardant quality are primarily of the two package type. That is, in order to prepare the product for application to the wall, the ultimate consumer had to mix a liquid with a dry stock blend in order to produce the useful liquid paint product. Often the fire retardant paints of the prior art, if mixed together for any duration more than 24 to 48 hours, were likely to gel or solidify in the package and to lose fluidity to such an extent that application by roller coater, or brush, or other conventional means of application became impossible.

Another serious limitation of the prior art fire retardant coating compositions resided in their lack of washability. In general most of the prior art compositions have provided an intumescent film upon exposure to flame that not only lacked the necessary smoothness to be acceptable for interior decoration, but were inadequate in durability. Upon exposure to washing, as for example in the removing of spots or in periodic cleaning with soap and water, the films were solubilized in the aqueous washing medium and were readily removed from the wall. In those cases where removal did not occur, most often the latent intumescent quality of the coating was dissipated with the first washing.

More fundamentally, however, the prior art fire retardant paint products were less effective than they might be in providing a resistance to fire and an insulating coating between the source of flame and combustible building materials within a building structure.

As is well known among those which are concerned with the problem of preventing economic loss due to unfriendly fires, the events concerned with the first few minutes of the outbreak of fire are extremely important in controlling the overall economic loss. If the ravaging quality of the fire can be delayed for longer periods of time, then the loss of fire and property are correlatively and materially reduced.

With the limitations of the prior art fire retardant coating compositions in mind, it is a primary object of this invention to provide a coating composition of conventional solvent reduced character having the application characteristics of a first quality inside organic solvent reducible wall paint.

It is an additional object of this invention to provide a ready-mixed protective and decorative coating composition which has latently fire retardant quality due to the ability of the deposited paint film to expand, to provide an insulating layer between the flame source and the building wall, as well as to provide a quantity of liberated products of decomposition which are primarily non-combustible and which tend to extinguish the flame.

It is a still further object of the invention to provide a protective and decorative coating having a pleasing appearance to the eye when applied to a wall surface as well as to have a latently flame reactive character potential in reducing heat transfer in its intumescent state during partial decomposition.

It is still another object of this invention to provide a novel paint composition which when exposed to flame will generate an intumescsent insulating layer and at the same time liberate gases which are either non-toxic, or possessed of a very low order of toxicity, upon flame decomposition and destructive distillation of the paint film.

These and other objects of the invention will become apparent as the description of the invention and examples illustrative of the invention are more fully developed in the following exposition.

Describing generally the coating composition of this invention, an ammonium phosphate (either mono or diammonium phosphate or mixtures thereof may be selected) in finely divided form; a non-alkylated, water soluble aqueously condensed, melamine-aldehyde condensate product in a dried powdered form; pentaerythritol in a dried powdered form; prime pigments including the generally used pigments of high opacity, for example, titanium dioxide zinc sulphide, lithopone, etc. along with any inert extender which may be included, and it is preferred to use inert extender pigments along with the prime pigment, are mixed together and wetted with a solution of chlorinated rubber in a volatile organic hydrocarbon solvent. Normally the chlorinated rubber useful and preferred for the present end purposes contains more than 20% but not more than about 70% by weight of chlorine and the chlorinated rubber solids constitute from about 5% to not more than about 12% of the total liquid paint composition.

The various dry stocks and the liquid halogenated rubber solution in a volatile hydrocarbon solvent is mixed in conventional paint mixing equipment and subjected to a zone of high shear to prepare a very fine heterogeneous dispersion of the various powdered dry stocks. Dispersion may be obtained by employment of a ball mill, by means of a roller mill, a Hy-R speed mill, colloid mill, bead mill, or any of the available means that are commonly used in the paint industry. Obviously it may be necessary to juggle the amount of solvent and the amount of pigment to binder ratio to accomplish the dispersion step and to provide the many desired influences upon the final performance of the paint product. For example, it is preferred to use from about 0.2 to about 20% by weight of the solid chlorinated rubber of a plasticizer for chlorinated rubber. Plasticizers are desirable to use in the present combination. The amount incorporated will fall generally into a range of from one to less than about five percent by weight of the total formulation if of the rosin ester type. Oxidized oil plasticizers may be used in excess of 4% without untoward difficulty or limitation of end use. Generally more than about 5% is not necessary, though permissive upon careful selection of the chemical nature thereof. If no plasticizer is used, cracks will develop in the film subsequent to drying but prior to flame exposure. If more than about 4% of rosin ester plasticizer is included, the film will tend to slide off vertical surfaces to which it may be applied during exposure to flame, thus care in quantity and kind of plasticizer selected should be exercised. It has been observed that the greater the quantity of amine-aldehyde condensation in the paint formula, the greater the tolerable quantity of plasticizer.

Illustratively useful plasticizers for chlorinated rubber are well known in the art and include chlorinated aromatic and aliphatic hydrocarbons containing from 20 to 70% chlorine, oil modified alkyd resins, expoxidized oils and epoxidized alkyds, the plasticizer esters of phthalic anhydride including the mixed alcohol esters, esters of rosin and hydrogenated rosin including methyl and diethylene glycol esters, for example, and as illustrative, the phosphate esters including the trialkyl phosphates, triamyl phosphate, and the aryl phosphates, illustratively tricresyl phosphate.

Other compatible resins can be used to supplement the chlorinated rubber and resins compatible therewith are well known in the art, though chlorinated alkyd resins containing chlorinated phthalic anhydride are preferred for the purpose of fire retardant quality.

I also prefer to add a small amount of lecithin or other colloidally active material including dimethyl dioctadecyl ammonium bentonite to the final mix just prior to the grinding step. Other components in minor amount, for example, chlorine acceptors, etc., may be added without materially interfering with the quality of the product.

Discussing the essential components of the composition in the order given above, but in greater detail, the ammonium phosphate may be either the mono, or di-ammonium phosphate. In general it is preferred to use the diammonium phosphate, but both ammonium phosphates are operable and useful for the purposes of the invention, and may be blended if desired.

The melamine-formaldehyde component is particularly critical as to composition to meet the ends of the invention. The mol ratio of melamine to aldehyde in the condensation product should fall within the range of from 1:1 to 1:4 and preferably within the range of from 1:2 to 1:3. The aldehyde-amine condensation is conducted in an aqueous mixture in the absence of alkylating alcohol. In other words, the amine-aldehyde condensation product is non-alkylated. It is most general and usual with most amine aldehyde resins intended for coating composition end use that they be alkylated. Further, the amine-aldehyde condensation is soluble in water and is insoluble in the usual organic solvents for paints. Examples I, II and III, which appear hereinafter in greater detail, illustratively describe the quality of amine-aldehyde resins necessary to obtain the optimum fire retardant quality as described and as is one of the objects of the invention. If the amine aldehyde resin is alkylated, the fire retardance of the carbonaceous foam is considerably decreased.

Pentaerythritol appears to be unique in its particular ability to form the residual carbonaceous matrix essential to the entrapment of the foam which forms upon exposure of a deposited paint film to flame conditions. It has been found that pentaerythritol is specific in its usefulness and that other materials which may be a source of carbonaceous foam lack coherence when compared on an otherwise equivalent basis with pentaerythritol. Using other materials suggested in the prior art, for example, starch, the intumescence is lacking or negligible and the flame spread and charred volume of test panels is so much increased that the coating compositions fail to pass standard fire-retardant tests.

The pigmentation of the product is to a considerable measure a part of the paint formulating art and the kinds and qualities of pigments selected do not appear to be of material significance other than it is found that the best results are obtained when using titanium dioxide as the prime pigment in conjunction with an inert pigment.

The total quantity of each of these pigmentary components may be varied in relation to one another and in relation to the total over-all solids content of the film. Said more technically, the pigment volume concentration may be varied between appreciably wide limitations without materially interfering with the quality of the resultant paint film. As is well known, however, the appearance of deposited dry paint in the film may be materially altered by controlling the pigment volume concentration. The quality of specular reflection of the film may be controlled by this means.

Turning to the nature of the binder, it may be observed superficially that the hydrocarbon solvents used to dissolve chlorinated rubber are extremely flammable. However, it is usual in fire retardant paints that exposure to flame occurs after the volatile solvents have been evaporated from the film and the solvents, having evaporated, no longer provide a source of hazard in relation to unfriendly fires. Upon breakdown of the dry paint film containing chlorinated rubber, the chlorine appears to serve initially to inhibit flame development and is believed to react with liberated ammonia from other of the components to destroy in some measure the toxicity of the liberated halogen containing gases.

To establish the quality of the fire retardant paints of this invention, the products of this invention were tested in accordance with the standard test method for fire hazard classification for building materials, ULC Subject, C-723, NFPA-255, ASTME 84-50T, a method which is also very similar to that used by the Underwriters Laboratories in the U.S. Standard panels are prepared which are 25 feet long, 20 inches wide and one inch thick, usually of laminated Douglas fir. The panels are coated at a rate of 100 sq. feet per gallon of the fire retardant coating as a standard. A flame of 2½ feet length is shot into one end of the box, the flame having a temperature of 1700° F. Air is admitted through the same end of the test zone at a rate of 240 linear feet per minute and various temperatures and conditions are observed within the confined area during the test. Normally two standards are used, one being a non-combustible asbestos cement panel and the other a standard combustible red oak panel, not painted. Among the data collected as a result of the test are the "flame spread," the "fuel contribution value" and a figure known as the "classification factor." By way of comparison, the standard asbestos cement panel has standard "flame spread" of about 2½ feet after a 10 minute time of burning test. The "flame spread" value is defined as the flame propagation in feet divided by the total potential length of the flame travel, which in this test was 19½ feet. Utilizing a material essentially as described in the illustrative example which follows, the "flame spread" of the paint product of the invention was of the order of 1 foot or the "flame spread" value of the order of 5.1 feet. In a test of ten prior art fire retardant paint products, "flame spread" under the same testing procedures were compared. The lowest "flame spread" value recorded in a test of any of the ten prior art products was of the order of 15–20. All others of the products tested were greater than 20 and some paint materials which were submitted as classifiable as fire retardant paints had values of the order of 50–70.

In determining the factor called "fuel contribution value," time is plotted as an abscissa and temperature as an ordinate, measuring the temperature developed at the end of the combustion chamber. The "fuel contribution value" using the standard asbestos board in the test box is of the order of 1880, while an unpainted red oak panel used as standard is of the order of 6920. The products of this invention under exactly the same test conditions were found to have a "fuel contribution value" of the order of 2035. A somewhat arbitrary "classification factor" is used by the Underwriters Laboratories which reflects the non-burning quality of panels subjected to flame tests. The standard asbestos cement panel has a "classification factor" of zero. The products of this invention in two separate tests were found to have a "classification factor" of 3.2. In prior art materials subjected to a similar rating, the lowest "classification factor" based on a similar test procedure was of the order of 15.

In a test for scrubbability, a glass panel was coated with two coats of the paint product of the subsequent example, the first coat at 0.0015 and the second coat at 0.003 inch in film thickness. After three weeks of dry, the paint was subjected to 5,000 cycles using the Gardner straight line washability machine Model 105A. 1% Ivory soap was used as the test solution. Only a slight polishing was noted. After 500 cycles of washing, the paint film intumesced upon exposure to flame conditions, maintaining practically completely its original intumescence depth.

The preceding tests establish the general marked superiority of the composition of this invention in performance over the prior art fire retardant coatings. The following examples illustrate one composition and preparation of the coating composition of this invention. Other preparations are not excluded and the examples are to be viewed as typical but not limiting.

*Example I*

| | Parts |
|---|---|
| Melamine (1 mol) | 126 |
| Formalin (3 mols) | 243 |

The pH of the mixture of these substances is adjusted to 6.3 as determined with bromthymol blue indicator (0.04%) in conjunction with a Hellige color disk, bromthymol blue D (No. 170–D). The mixture is heated up to about 80° C. over about one-half hour. The temperature is then allowed to drop to about 60° C. requiring about 10 minutes, and it is maintained at that temperature for one-half hour measured from the time that the mixture originally attained 60° C. After this time, the syrup is adjusted to a pH of about 8–8.5 and it is filtered to remove any insoluble impurities which may be present, thereby producing a clear hydrophilic resin syrup. The syrup is now concentrated by heating under a vacuum of about 9–10 inches of mercury absolute pressure, the vacuum being maintained at such a point that the temperature of the resinous syrup will be high enough to keep it fluid, i.e., above the melting point thereof. This temperature will vary from about 50° C. to a temperature slightly above 100° C., e.g., 105–115° C. as water is removed. When the resinous syrup has been substantially dehydrated, it is removed from the concentrating kettle and cooled to produce a substantially clear, solid resin which is ground to a fine white powder.

*Example II*

126 parts of melamine (1 molecular proportion) and 325 parts (4 molecular proportions) of a 37% aqueous formaldehyde solution are charged to a reaction kettle equipped with a stirrer. Thereafter, while stirring, sufficient sodium hydroxide in the form of a 20% aqueous solution is added to produce a pH of 9.0–9.5 and while continuing the stirring the mixture is heated to about 80° C. This requires about 15–30 minutes and by the time the temperature reaches 80° C. a clear syrup is obtained. The hot syrup is filtered, while maintaining its temperature at 80–85° C., into a vessel equipped with a stirrer and heated to maintain the filtered syrup at 80–85° C. Thereafter the syrup is fed to a spray drier at a rate sufficient to produce about 225 parts of solid product per hour. The spray drying of the hot aqueous syrup is accomplished by spraying the material into a heated stream of gas which initially has a temperature of about 190–210° C. but immediately after the water is removed from the spray, is cooled so that the outlet gas temperature is below the fusion temperature of the dehydrated product, i.e., below about 65–70° C. but above the dew point of the gas. The cooling of the gas stream may be effected by bleeding cooled air into the lower portion of the drier. The mixture of powdery product and the outflowing gas is then passed through a dust collector, such as a cyclone collector, to separate out the powdery product.

During the operations prior to spray drying, the aqueous syrup is maintained at a pH of 9.0–9.5 by adding additional sodium hydroxide solution when necessary.

The powdered product obtained in the manner described above possesses solubility in water in all proportions at ordinary temperatures, i.e., 20–30° C., and exhibits an amorphous structure when subjected to X-ray examination.

*Example III*

Example I is repeated except that a mixture of 126 parts of melamine (1 molecular proportion) and 162 parts (2 molecular proportions) of 37% aqueous formaldehyde solution is reacted in the presence of 177 parts of added water. Due to the lower proportion of formaldehyde as compared with Example I, the outlet gas temperature in the spray drier may be higher than that employed in Example I, for example, 80° C. without causing melting of the powdered product. The product has an amorphous structure and possesses unlimited solubility in water at ordinary temperatures.

*Example IV*

200 parts mono ammonium phosphate
80 parts melamine-formaldehyde condensate powder (of Ex. I)
85 parts pentaerythritol
100 parts titanium dioxide pigment
25 parts asbestine pigment (inert)
500 parts 20% solids content, 125 cps. grade chlorinated rubber (about 67% chlorine content by weight), 80% volatile (xylol) high flash naphtha hydrocarbon solvent
30 parts hydrogenated rosin mono ester of glycerine
5 parts lecithin The above components are weighed out in a pony mixer, the solids thoroughly dispersed in the liquids by coarse mixing and the contents of the mixer are passed over a three roll grinding mill of conventional design.

The product is further capable of being reduced in viscosity with hydrocarbon solvents, illustratively xylene. As the hydrocarbon solvents are dissipated in the air upon application of the paint in a film, they do not materially interfere with the fire retardant quality of the dry paint product. Other examples may be derived from the above illustrative example substituting other amine-aldehyde condensation products as illustrated by Examples II and III, and by variation in the quantities of components as follows:

The quantities indicated in the foregoing examples are not particularly critical, but it is preferable that the melamine formaldehyde solids to chlorinated rubber solids lie within the weight range of from 2:1 to 1:2 with a preferable result obtained at a 1:1 range. The ratio of diammonium phosphate to pentaerythritol, illustratively, should lie within the range of weight ratio of 5:1 to 2:1 and again preferable results are obtained at about a 2½:1 ratio.

While the examples and disclosure has referred primarily to melamine-formaldehyde condensations, other amine-aldehyde resins lying within the stoichiometric molar ratios and meeting with the other limitations of the amine-aldehyde resins previously referred to are substantially equivalent for the purposes of this invention. While it is preferable to use melamine-formaldehyde condensation products wherein the ratio of amine to aldehyde is within the range of 1:1 to 1:4, urea may be substituted in whole or in part for the melamine.

In general, the ammonium phosphate will range from 10% to 25% by weight, pentaerythritol 5–15% by weight, the prime and inert pigments from 5–15% by weight and the melamine-formaldehyde condensation, as a dry stock, from 5–15% by weight of the total paint composition. The halogenated rubber solids content will constitute at least 5% but not more than about 12% of the total "wet" paint weight. The amount of plasticizer, of course, will be related to the amount of chlorinated rubber used as a binder and the percent of amine-aldehyde condensation in the total wet or liquid fire retardant composition.

Other limitations in the quantities of components and the qualities of other additives not discussed in detail but which are commonly used in decorative and protective coatings may be evolved in order to obtain specific variations in the end performance of the coatings of this invention. Such variations as are desired in preparation of coatings for a variety of substrates, including wood, metals, etc., are within the skill of the paint formulators' art.

Having thus described my invention, what I claim is:

1. A solvent reducible fire retardant liquid paint product having applicability and performance quality of a standard protective and decorative coating for interior wall areas which comprises in combination a finely divided heterogeneous suspension of ammonium phosphate; pentaerythritol; an inorganic pigment; and an aqueously condensed dried, powdered, non-alkylated water-soluble melamine-aldehyde condensation product, all of said powders dispersed in a liquid suspension medium comprising a volatile organic solvent solution of a chlorinated rubber, said rubber solids containing more than 20% but not more than about 70% chlorine content; the chlorinated rubber solids constituting at least 5% but not more than about 12% of the total wet paint weight; the ratio of ammonium phosphate to pentaerythritol within the weight range of 5:1 to 2:1; and the mol ratio of amine to aldehyde in said amine-aldehyde condensation product within the range of 1:1 to 1:4.

2. The product of claim 1, wherein the ratio of amine-aldehyde condensation product solids to chlorinated rubber solids is limited to the ratio of not more than 2:1 nor less than 1:2.

3. The product of claim 1, wherein the ammonium phosphate is from 10% to 25% by weight, the pentaerythritol is from 5 to 15% by weight and the amine-aldehyde condensation product is from 5 to 15% by weight of the total liquid paint composition.

4. The product of claim 1, wherein the ammonium phosphate is diammonium phosphate.

5. The product of claim 1, wherein the ammonium phosphate is mono-ammonium phosphate.

6. The product of claim 1 wherein the ammonium phosphate is a mixture of mono and di-ammonium phosphate.

References Cited in the file of this patent

UNITED STATES PATENTS

| | | |
|---|---|---|
| 2,596,939 | Nielsen et al. | May 13, 1952 |
| 2,650,206 | Stock | Aug. 25, 1953 |
| 2,680,102 | Becher | June 1, 1954 |